United States Patent [19]
Humbert

[11] 3,994,613
[45] Nov. 30, 1976

[54] DEVICE FOR POSITIONING CUTTERS IN AN ANNULAR CUTTER HOLDER

[75] Inventor: Marvin Humbert, Cedar Rapids, Iowa

[73] Assignee: Cedar Rapids Engineering Company, Cedar Rapids, Iowa

[22] Filed: Mar. 26, 1975

[21] Appl. No.: 562,345

[52] U.S. Cl. .............................. 408/116; 408/175; 408/709
[51] Int. Cl.² ...................................... B23B 49/00
[58] Field of Search ............ 408/16, 116, 709, 175, 408/176; 33/185 R, 148 G, DIG. 8

[56] References Cited
UNITED STATES PATENTS

| | | | |
|---|---|---|---|
| 2,627,193 | 2/1953 | Statia | 408/116 X |
| 2,869,401 | 1/1959 | Wagner et al. | 408/116 |
| 3,693,682 | 9/1972 | Hasfjord | 33/185 R X |
| 3,905,717 | 9/1975 | Brooks | 408/709 X |

Primary Examiner—Travis S. McGehee
Attorney, Agent, or Firm—Hill, Gross, Simpson, Van Santen, Steadman, Chiara & Simpson

[57] ABSTRACT

A device for setting cutters in the periphery of an annular cutter holder to a plurality of selected radii, said device including a base for rotatably supporting the cutter holder and an adjustable gauge mounted on said base which may be selectively positioned at a plurality of settings to provide a plurality of distances to which cutters may be set from the center of the cutter holder, said cutter holder having one or more angular shaped slots in the underside thereof for receiving cutters therein and wedge means for securing the cutters in said slots.

7 Claims, 9 Drawing Figures

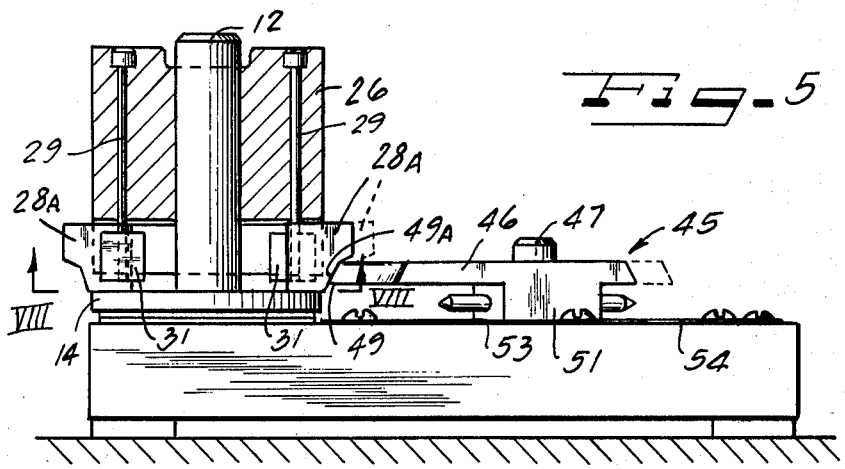
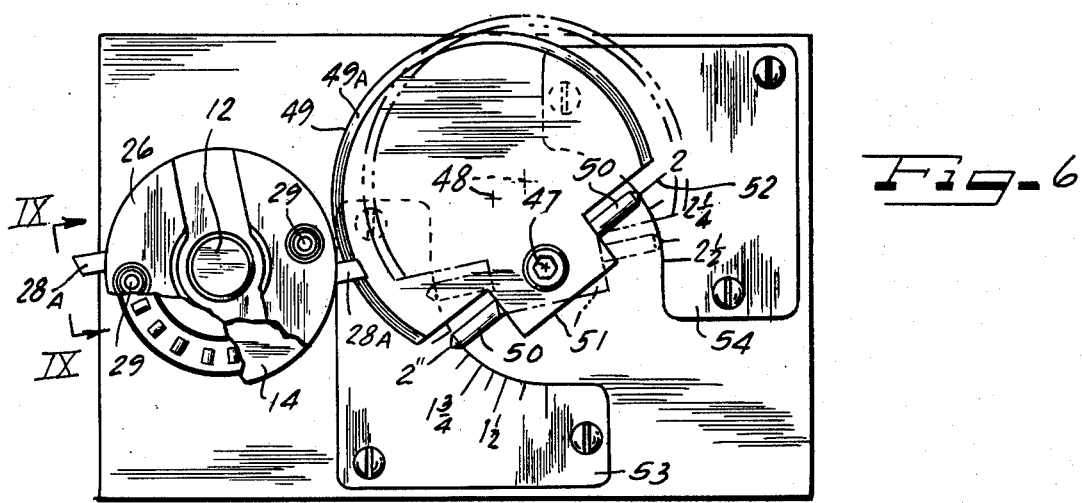
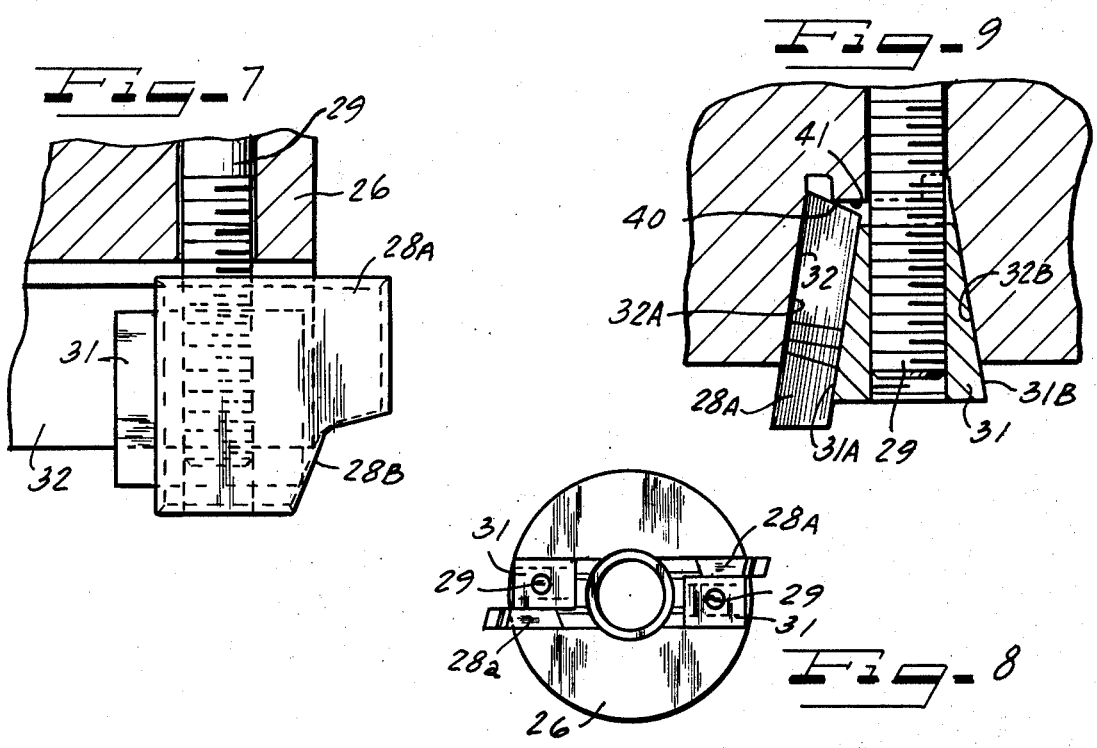

DEVICE FOR POSITIONING CUTTERS IN AN ANNULAR CUTTER HOLDER

BACKGROUND OF THE INVENTION

This invention relates to a fixture or device for setting cutters in the periphery of a cutter holder at a plurality of measured distances from the center of the cutter.

SUMMARY OF THE INVENTION

A principal object of this invention is to provide a means for accurately positioning cutters in an annular cutter holder.

Another object of this invention is to provide an improved cutter holder wherein a cutter may be securely and accurately positioned.

Another object is to provide an adjustable gauge means as part of a cutter setting fixture whereby cutters may be accurately positioned in an annular cutter holder at a plurality of selected positions.

A still further object of this invention is to provide an eccentrically mounted adjustable gauge device as part of a cutter setting fixture for positioning cutters in an annular cutter holder at a plurality of selected positions.

Other objects and advantages of this invention will become more apparent when considering the following description in connection with the accompanying drawings.

DESCRIPTION OF THE DRAWINGS

FIG. 5 is a front view in elevation partially in section of another embodiment of a device for setting cutters in a cutter holder;

FIG. 6 is a top plan view of the device of FIG. 5;

FIG. 7 is a partial view in elevation showing a cutter wedged into a secure position in a cutter holder;

FIG. 8 is a bottom plan view of a cutter holder taken along line 8—8 of FIG. 5;

FIG. 9 is an enlarged view in elevation of a portion of the cutter holder taken along line 9—9 of FIG. 5 showing the cutter insert held in a wedged position.

DESCRIPTION OF PREFERRED EMBODIMENTS

Figure 1:
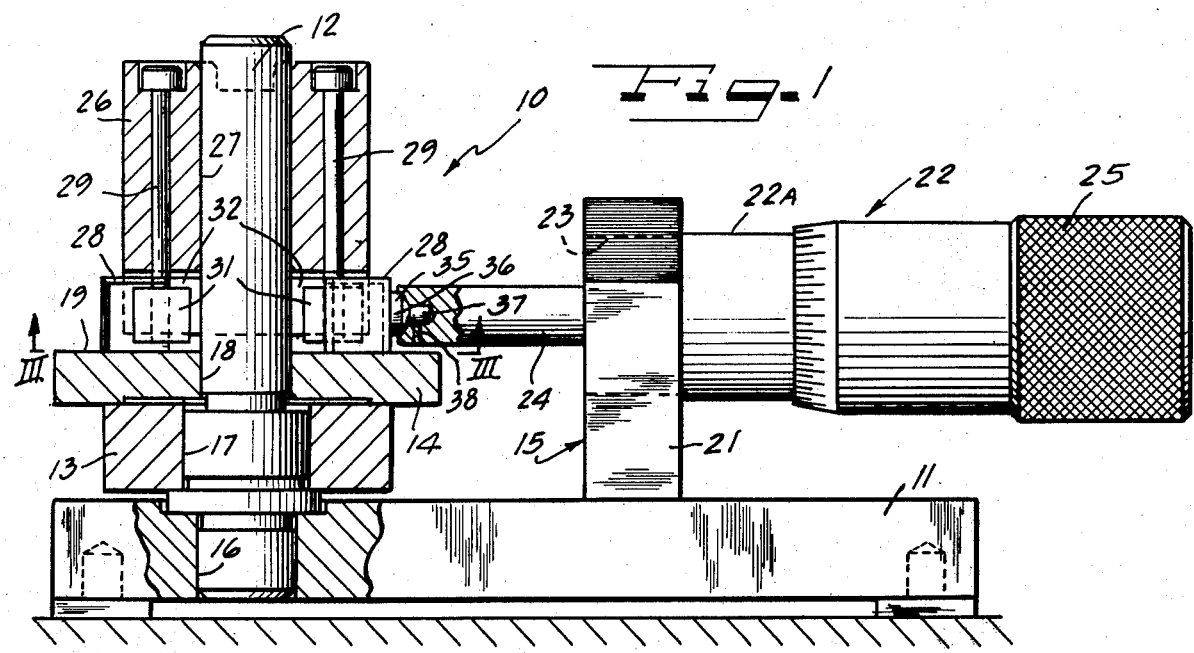
FIG. 1 is a front elevation view partially in section of a device for setting cutters in a cutter holder embodying the invention herein.

Turning now to the drawings wherein like reference characters refer to similar parts, FIG. 1 shows a first embodiment of an apparatus embodying the invention herein. This apparatus is designated generally as 10. The apparatus 10 comprises a base 11, a center post or spindle 12 vertically mounted in the base 11, a flat bearing block 13, a set plate 14 and a gauge device 15 mounted on the base 11. The spindle 12 is fitted into a bore 16 in the base 11. The bearing block 13 is formed with a bore 17 in which an enlarged portion of the spindle 12 is received. The set plate 14 is formed with a bore 18 for receiving the spindle 12 therethrough and rests on the bearing block 13. The set plate is formed with a flat horizontally extending surface 19. The bearing block 13 may be formed either with an upper flat surface or may have roller bearings disposed in the surface so that the set plate may rotate freely thereon.

The gauge device 15 may comprise a micrometer type unit which is supported in a micrometer mounting bracket 21 which is secured to the base 11. A micrometer 22 may be supported in the micrometer mounting 21 by having its tubular portion 22A extend through a bore 23 in the micrometer mounting along a horizontal axis perpendicular to the axis of the spindle 12. The micrometer stem 24 may be easily moved back and forth by rotating the micrometer end 25.

Because cutters to the type here contemplated are usually of an extremely hard material, and normally harder than a micrometer stem, the repeated contact with the end of the micrometer stem 24 would have a tendency to cause wear of the end of the micrometer stem. To overcome that possible problem, the micrometer stem used herein is equipped with an end insert 35 of an extremely hard material similar to cutter material which is highly resistant to wear and probably harder than any of the materials used in the cutters which are to be set with this device. The insert 35 may be formed with an enlarged outer end 36 and a smaller internal end which is supported in a bore in the end of the micrometer stem and held secured therein by set screw 38 or other suitable means.

Figure 4:
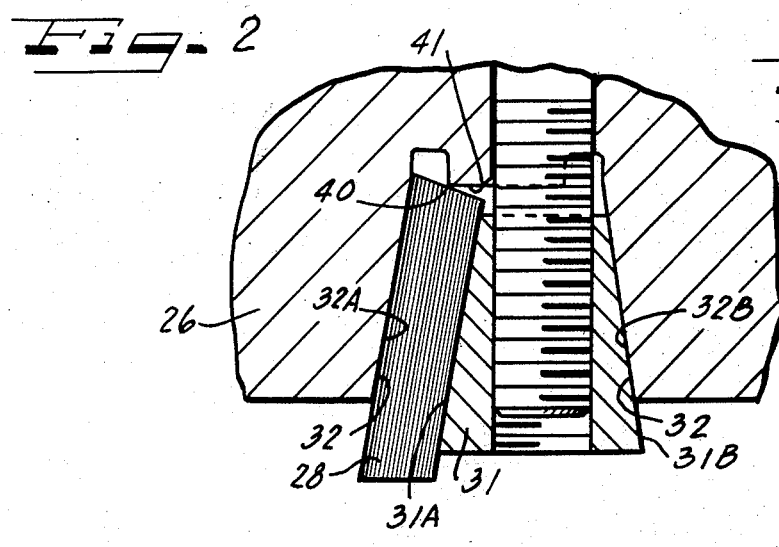
FIG. 4 is an enlarged view of a portion of the cutter holder taken along line 4—4 of FIG. 2 showing the cutter insert wedged in position.

A cutter holder 26 which may be an elongated annular body is formed with a central bore 27 through which the spindle 12 is adapted to be received. In the particular embodiment illustrated in FIG. 1, cutters 28 are secured in the underside of the cutter holder 26 by means of elongated bolts 29 and trapezoidal shaped wedge elements 31 attached to the threaded ends of the bolts 29. The cutter holder 26 is formed on its underside with slots 32 having tapered sides between which are positioned a cutter 28 and a wedge element 31. The cutters are flat having parallel sides, one side of which engages the side of the slot and the other engaging the side of the wedge. The taper on the wedge 31 and the taper on the slot 32 is exactly the same, that is, the left and right sides or walls 31A, 32A and 31B, 32B of the wedge 31 and slot 32, respectively, as viewed in FIG. 4, for example, are parallel. A stop in the form of a shoulder 40 is formed on the upper face 41 of the slot 32 which is effective to precisely position the cutter in its upward position in the cutter holder 26. In the assembly the cutter 28 normally will always bear against the stop 40. It will be apparent from viewing FIGS. 1 and 4, for example, that tightening up on the bolts 29 will draw the wedge element 31 up into the slot 32 to tightly wedge the cutter insert 28 between the tapered side of the slot and the wedge element and up against the stop 40.

Figure 2:
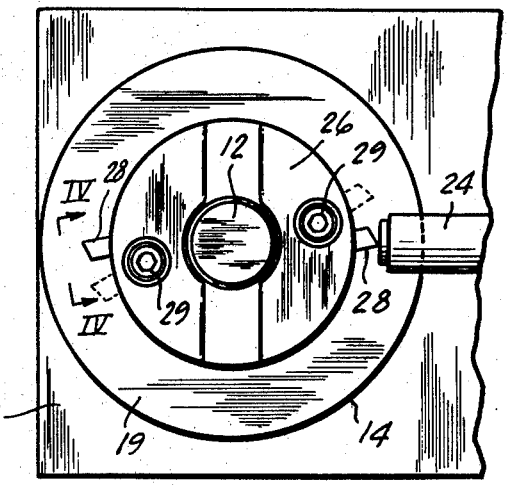
FIG. 2 is a top plan view of a portion of the device of FIG. 1.
Figure 3:
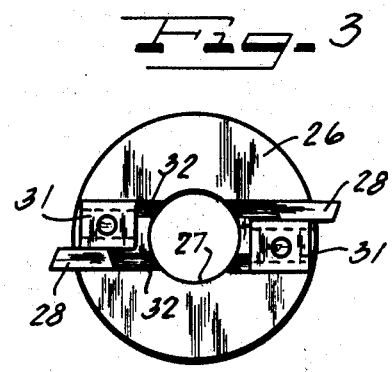
FIG. 3 is a bottom plan view of the cutter holder of FIG. 1 taken along line 3—3 of FIG. 1.

In order to set each cutter 28 at a specified radial distance from the center of the cutter holder, it is merely necessary to set the micrometer at the desired setting say, for example, two inches. With the bolt 29 loosened the cutter is then moved radially outwardly from a less than tight position in the cutter holder to the point where its cutting edge just touches the end of the micrometer stem as the cutter holder is rotated through an adjusting arc. This operation is performed separately for each cutter mounted in the cutter holder. It will be appreciated that while two cutters are shown in the embodiment shown in FIGS. 1, 2 and 3 this device could be utilized to set cutter inserts in a cutter holder carrying any number of cutters. Then bolt 29 is tightened to lock the cutter at the set position.

Another embodiment of an apparatus for setting cutters in a cutter holder is illustrated in FIGS. 5 through 9. This apparatus differs from that of FIG. 1 in that the gauge device used for setting the cutters at prescribed radii is of another type. The gauge device 45 associated with the apparatus shown in FIG. 5 comprises a substantially semi-circular disc segment 46 which is eccentrically mounted to swing in a horizontal plane about a pivot post 47. It will be observed that the outer edge of the disc 46 describes a portion of a circular arc but that the pivot post 47 is offset from the center 48 of that arc. Thus, it will be apparent that when the disc 46 is moved about the pivot point 47 the edge 49 of the disc will be moved to different distances from the center of the spindle 12. Thus, it is possible by positioning the disc 46 at selected positions to provide different settings for the cutter radii. The disc 46 is equipped with pointers 50 which extend from each side of the boss 51 attached to the disc 46 and in which the pivotal mounting 47 is supported.

Measurement indicia 52 are scribed in plate members 53 and 54 attached to the base 11. The plate members are formed with arcuate portions on which the measurement indicia are inscribed and, thereby, cooperate with the pointers 50. Thus, if a cutter radius of two inches is desired the disc 46 is merely rotated until the pointers 50 are aligned with the two inch mark on the plate members 53 and 54 and the disc 46 is then secured in place by tightening the bolt 47 which may serve as the pivot post or by other suitable means. The cutters 28, assuming they are of the straight edge type as shown in FIGS. 1–4, are then moved in or out radially in the cutter holder to a point where when the cutter holder is rotated back and forth, the cutting edge of the cutters 28 will barely touch the disc 46. When the correct position of the cutter 28 is established the bolt 29 may be tightened to wedge the cutter in place by means of the wedge 31.

One additional feature will be observed in connection with the gauge device of FIG. 5. The edge of the disc 46 may be formed with a contoured edge 49A so that a cutter 28A having a contoured cutting edge 28B may be adjusted not only by a radial in and out adjustment movement of the cutter but also by an up and down adjustment of the cutter in the cutter holder.

While preferred embodiments of the invention have been disclosed, it will be appreciated that these have been shown by way of example only, and the invention is not to be limited thereto as other variations will be apparent to those skilled in the art and the invention is to be given its fullest possible interpretation within the terms of the following claims.

What is claimed is:
1. A device for setting cutter blades at predetermined positions in the periphery of cutter holder comprising:
   a base;
   means for rotatably mounting an annular cutter holder on said base;
   a gauge device mounted on said base;
   said gauge device being adjustable at a plurality of positions to provide predetermined radial settings for the cutters in said cutter holders,
   wherein said gauge device comprises an eccentrically mounted disc mounted for pivotal movement so that successive positions on the edge of said disc define predetermined settings from the center of a cutter holder in which cutter blades are to be supported, and
   including measurement indicia on said base to be used for setting said eccentrically mounted disc at any one of a plurality of selectable positions for setting a cutter at a desired radial setting.
2. The device of claim 1 wherein
   said eccentrically mounted disc is a substantially semi-circular disc segment.
3. The device of claim 2 wherein
   said eccentrically mounted disc is equipped with pointer means adapted to selectively point to measurement indicia to indicate the radial setting at which a cutter is to be set.
4. The device of claim 1 including
   pointer means connected to said eccentrically mounted disc for alignment with said measurement indicia.
5. A device for setting cutter blades at predetermined positions in the periphery of cutter holder comprising:
   a base;
   means for rotatably mounting an annular cutter holder on said base;
   a gauge device mounted on said base;
   said gauge device being adjustable at a plurality of positions to provide predetermined radial settings for the cutters in said cutter holders,
   wherein said gauge device comprises an eccentrically mounted disc mounted for pivotal movement so that successive positions on the edge of said disc define predetermined settings from the center of a cutter holder in which cutter blades are to be supported and
   wherein the edge of said eccentrically mounted disc is contoured so that cutters may be set at a prescribed height as well as at a prescribed radial setting.
6. A device for setting blades at predetermined positions in the periphery of a cutter holder having an annular body formed with a central bore and said cutter blades extending generally radially from said cutter holder comprising, a jig having a base plate, a spindle mounted on said base plate, a rotatable set plate formed with an opening through which said spindle extends and formed with an upper flat surface normal to the axis of said spindle, said cutter holder receivable over said spindle and formed with a flat lower surface normal to the axis of said spindle for mating engagement with said upper flat surface of said rotatable set plate and said cutter holder and said set plate rotatable as a unit relative to said base plate, a micrometer mounting bracket attached to said base plate, and a micrometer mounted on said mounting bracket and having a moveable stem extending radially of said spindle and having an end which is adjustable relative to the ends of said cutter blades.
7. The device of claim 6 wherein
   said micrometer includes a longitudinally movable micrometer stem and a hardened insert disposed in the free end of said stem to protect against wear on the end of said stem by cutter elements.

* * * * *